United States Patent
Katou

(10) Patent No.: US 9,033,511 B2
(45) Date of Patent: May 19, 2015

(54) ILLUMINATING DEVICE INCLUDING REFLECTIVE POLARIZING PLATE AND PROJECTION DISPLAY DEVICE USING THE SAME

(75) Inventor: Atsushi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 473 days.

(21) Appl. No.: 13/395,873

(22) PCT Filed: Sep. 16, 2009

(86) PCT No.: PCT/JP2009/066178
§ 371 (c)(1),
(2), (4) Date: Mar. 13, 2012

(87) PCT Pub. No.: WO2011/033627
PCT Pub. Date: Mar. 24, 2011

(65) Prior Publication Data
US 2012/0182524 A1 Jul. 19, 2012

(51) Int. Cl.
*G03B 21/14* (2006.01)
*G03B 21/28* (2006.01)
(Continued)

(52) U.S. Cl.
CPC ........... *H04N 9/3167* (2013.01); *H04N 9/3197* (2013.01); *G02B 27/283* (2013.01);
(Continued)

(58) Field of Classification Search
CPC . H04N 9/3197; H04N 9/3167; G02B 27/285; G02B 27/283; G02B 5/30; G02B 27/28; G02F 1/13362; G02F 1/1335; G03B 21/208; G03B 21/14; G03B 21/28
USPC ............ 353/20, 98; 349/113, 96; 359/485.01, 359/485.03
See application file for complete search history.

(56) References Cited

U.S. PATENT DOCUMENTS 6,910,772 B2  6/2005  Yano
6,966,656 B2  11/2005  Yano
(Continued)

FOREIGN PATENT DOCUMENTS

CN  1892290 A  1/2007
JP  2000-206464 A  7/2000
(Continued)

OTHER PUBLICATIONS

International Search Report in PCT/JP2009/066178 dated Oct. 13, 2009 (English Translation Thereof).
(Continued)

*Primary Examiner* — Toan Ton
*Assistant Examiner* — Magda Cruz
(74) *Attorney, Agent, or Firm* — McGinn IP Law Group, PLLC

(57) ABSTRACT

Provided is an illumination device that includes: light source (101); light guiding means (102) where light from light source (101) is supplied to one end surface, and light incident from the one end surface is propagated inside to exit from the other end surface; illuminating optical systems (103, 104, 106, and 107) that spatially separate a luminous flux output from the other end surface of light guiding means (102) into a plurality of luminous fluxes and that form, on display element (110), an optical image formed on the other end surface of light guiding means (102); reflective polarizing plate (109) that is located between illuminating optical systems (103, 104, 106, and 107) and display element (110) and that transmits first polarized light while reflecting second polarized light different in polarized state from the first polarized light toward illuminating optical systems (103, 104, 106, and 107); reflecting element (105) that is disposed at a position where the plurality of luminous fluxes are spatially separated and that reflects light reflected by reflective polarizing plate (109) toward reflective polarizing plate (109); and phase plate (108) located between reflecting element (105) and reflective polarizing plate (109). Reflecting element (105) includes a transmission region through which the plurality of luminous fluxes are transmitted, and a reflecting film formed in a region other than the transmission region.

16 Claims, 6 Drawing Sheets

(51) Int. Cl.
    *G02F 1/1335* (2006.01)
    *G02B 5/30* (2006.01)
    *G02B 27/28* (2006.01)
    *H04N 9/31* (2006.01)
    *G03B 21/20* (2006.01)
    *G02B 17/00* (2006.01)
    *G02B 27/09* (2006.01)

(52) U.S. Cl.
    CPC .......... *G02B27/285* (2013.01); *G02F 1/13362* (2013.01); *G03B 21/208* (2013.01); *G02F 1/1335* (2013.01); *G02B 5/30* (2013.01); *G02B 27/28* (2013.01); *G02B 17/006* (2013.01); *G02B 27/0994* (2013.01); *G03B 21/2073* (2013.01)

(56) References Cited

U.S. PATENT DOCUMENTS

| | | | |
|---|---|---|---|
| 7,481,538 B2 | 1/2009 | Furusawa et al. | |
| 2001/0028412 A1* | 10/2001 | Ito | 349/5 |
| 2003/0002151 A1 | 1/2003 | Yano | |
| 2005/0146691 A1 | 7/2005 | Yano | |
| 2005/0225728 A1 | 10/2005 | Yano | |
| 2006/0077353 A1 | 4/2006 | Wu | |
| 2006/0078266 A1 | 4/2006 | Wu et al. | |

FOREIGN PATENT DOCUMENTS

| | | | |
|---|---|---|---|
| JP | 2001-100314 A | 4/2001 |
| JP | 2001-324762 A | 11/2001 |
| JP | 2002-328430 A | 11/2002 |
| JP | 3473557 B2 | 12/2003 |
| JP | 2006-106682 A | 4/2006 |
| JP | 2006-106683 A | 4/2006 |
| JP | 3780873 B2 | 5/2006 |
| JP | 2008-65027 A | 3/2008 |
| JP | 2008-070529 A | 3/2008 |
| JP | 2009-3444 A | 1/2009 |

OTHER PUBLICATIONS

Hans Zou, et al., "Single-Panel LCoS Color Projector with LED Light Source" pp. 1698 to 1701, SID 05 DIGEST, 2005.
O.H. Willemsen, et al., "A Handheld Mini-Projector Using LED Light Sources" pp. 1706 to 1709, SID 05 DIGEST, 2005.
Juan Manuel Teijido, et al., "Compact Three Panel LED Projector Engine for Portable Applications" pp. 2011 to 2014, SID 06 DIGEST, 2006.
Chinese Office Action dated Dec. 25, 2013, with English translation.

* cited by examiner

ILLUMINATING DEVICE INCLUDING REFLECTIVE POLARIZING PLATE AND PROJECTION DISPLAY DEVICE USING THE SAME

TECHNICAL FIELD

The present invention relates to an illuminating device of a projection display device represented by a liquid crystal projector, and more particularly to an illuminating device that illuminates a display element including a conversion element.

BACKGROUND ART

Patent Literatures 1 and 2 discuss a projector that uses a LED (Light Emitting Diode) as a light source for illuminating a DMD (Digital Micromirror Device) serving as a display element. The projector of this type is expected to reduce costs more than a projector that uses a white discharge lamp, and achieve performance including miniaturization, lower power consumption, and a wider color reproduction range.

There are also a projector that uses a single LCoS (Liquid Crystal on Silicon) element (Nonpatent Literature 1), and a projector that users three liquid crystal panels as display elements (Nonpatent Literatures 2 and 3).

In the liquid crystal projector, usually, a liquid crystal panel must be illuminated with polarized light. Generally, light from the LED is unpolarized light. Thus, when the LED is used as a light source for illuminating the liquid crystal panel, it is preferable that the light from the LED be converted into polarized light to increase light use efficiency.

For example, when a display panel is a TN liquid crystal (Twisted Nematic Liquid Crystal) panel, with respect to the unpolarized light from the LED which includes two linear polarized components which are orthogonal each other, one of linear polarized component is converted to be similar to the other polarized component. When efficiency of this polarizing conversion is low, the light use efficiency declines. When no polarizing conversion is carried out, about a half of the light is not used as illumination light.

In the projector described in Nonpatent Literature 1, a luminous flux from the LED that is the light source is roughly converted into parallel luminous fluxes by a light guiding member having a composite paraboloidal surface shape, which is referred to as a CPC reflector. The display panel is illuminated with the parallel luminous fluxes from the light guiding member.

A ¼ wavelength plate and a reflective polarizing plate are located in the traveling direction of the luminous flux from the light guiding member. For example, the polarizing plate transmits p-polarized light while reflecting s-polarized light. The s-polarized light reflected by the polarizing plate passes through the ¼ wavelength plate. The light (circular polarized light) passed through the ¼ wavelength plate returns to the LED to be reflected on a surface of the LED. The light reflected on the surface of the LED is converted parallel by the light guiding member, and then passes through the ¼ wavelength plate again.

A portion of the s-polarized light reflected by the polarizing plate, which has passed through the ¼ wavelength plate twice in the returning process to the LED and in the process of being reflected on the surface of the LED to travel toward the polarizing plate, is converted into p-polarized light.

In addition, there is an illuminating device discussed in Patent Literature 3. This illuminating device includes: a light source; a glass rod one end surface of which light from the light source enters; condensing means for condensing a luminous flux that has exited from the other end surface of the glass rod; and a PBS (Polarizing Beam Splitter) polarizing conversion array disposed at a position where the condensing means forms a plurality of light source images.

The PBS polarizing conversion array is formed by alternately arranging first and second prisms in one direction. Each of the first and second prisms is a rectangular parallelepiped prism formed by bonding two rectangular prisms together.

The first prism includes a polarizing separation film formed on the bonded surface of the two rectangular prisms to transmit the p-polarized light while reflecting the s-polarized light, and is configured so that incident light can enter the polarizing separation film at an incident angle of about 45 degrees.

The second prism includes a reflecting film formed on the bonded surface of the two rectangular prisms, and is configured so that the s-polarized light reflected by the polarizing separation film of the first prism can enter the reflecting film at an incident angle of about 45 degrees. A surface of the second prism located in the traveling direction of the light reflected by the reflection film is an exit surface. A ½ wavelength plate for converting the s-polarized light into p-polarized light is formed on the exit surface. A light shielding plate is formed on a surface opposite the exit surface of the second prism.

The p-polarized light output from the first prism and the p-polarized light output from the second prism travel in the same direction. The condensing means is configured to form a light source image on an incident surface of the first prism.

CITATION LIST

Patent Literature

Patent Literature 1: JP2006-106683A
Patent Literature 2: JP2006-106682A
Patent Literature 3: JP2000-206464A

Nonpatent Literature

Nonpatent Literature 1: pp. 1698 to 1701, "Single-Panel LCoS Color Projector with LED Light Source" SID 05 DIGEST
Nonpatent Literature 2: pp. 1706 to 1709, "A Handheld Mini-Projector Using LED Light Sources" SID 05 DIGEST
Nonpatent Literature 3: pp. 2011 to 2014, "Compact Three Panel LED Projector Engine for Portable Applications" SID 06 DIGEST

SUMMARY OF INVENTION

However, the projector described in Nonpatent Literature 1 has the following problem.

The light of the polarized component reflected by the reflective polarizing plate efficiently returns to the surface of the LED. However, on the surface of the LED, only a part of the returned light is reflected toward the polarizing plate. Thus, a light loss occurs on the surface of the LED, thus preventing realization of high polarizing conversion efficiency.

The illuminating device described in Patent Literature 3 is difficult to be miniaturized because of the use of the PBS polarizing conversion array. For example, recent miniaturization of the display panel may require a pitch of each prism of the PBS polarizing conversion array to be about 1 millimeter.

When the first and second prisms are formed at such pitches, it is difficult to bond the ½ wavelength plate to the second prism.

In the future, the display panel is expected to be further miniaturized. Thus, the problem of miniaturization in the illuminating device that uses the PBS polarizing conversion array will become more pronounced.

It is an object of the present invention to provide a compact illuminating device capable of increasing light use efficiency by improving polarizing conversion efficiency, which can solve the above mentioned problems, and a projection display device that uses the same.

Solution to Problems

To achieve the object, an illumination device according to the present invention includes:
a light source;
light guiding means where light from the light source is supplied to one end surface, and light incident from the one end surface is propagated inside to exit from the other end surface;
an illuminating optical system that spatially separates a luminous flux output from the other end surface of the light guiding means into a plurality of luminous fluxes and that forms, on a display element, an optical image formed on the other end surface of the light guiding means;
a reflective polarizing plate that is located between the illuminating optical system and the display element and that transmits first polarized light while reflecting second polarized light different in polarized state from the first polarized light toward the illuminating optical system;
a reflecting element that is disposed at a position where the plurality of luminous fluxes are spatially separated and that reflects light reflected by the reflective polarizing plate toward the reflective polarizing plate; and
a retardation plate that is located between the reflecting element and the reflective polarizing plate.

In this case, the reflecting element includes a transmission region through which the plurality of luminous fluxes are transmitted, and a reflecting film that is formed in a region other than the transmission region;
a light emitting center of the light source is located on a center axis that passes through a center of gravity of both end surfaces of the light guiding means; and
the illuminating optical system forms, on the reflecting film, a plurality of optical images that is formed on the reflective polarizing plate by the second polarized light of the plurality of luminous fluxes that passed through the transmission region.

A projection type display device according to the present invention includes:
an illumination device;
a display element illuminated with light from the illumination device; and
a projection optical system that projects image light from the display element.

In this case, the illumination device includes:
a light source;
light guiding means where light from the light source is supplied to one end surface, and light incident from the one end surface is propagated inside to exit from the other end surface;
an illuminating optical system that spatially separates a luminous flux output from the other end surface of the light guiding means into a plurality of luminous fluxes and that forms, on the display element, an optical image that is formed on the other end surface of the light guiding means;
a reflective polarizing plate that is located between the illuminating optical system and the display element and that transmits first polarized light while reflecting second polarized light different in polarized state from the first polarized light toward the illuminating optical system;
a reflecting element that is disposed at a position where the plurality of luminous fluxes are spatially separated and that reflects light reflected by the reflective polarizing plate toward the reflective polarizing plate; and
a retardation plate that is located between the reflecting element and the reflective polarizing plate.

The reflecting element includes a transmission region through which the plurality of luminous fluxes are transmitted, and a reflecting film that is formed in a region other than the transmission region.

A light emitting center of the light source is located on a center axis passing through a center of gravity of both end surfaces of the light guiding means.

The illuminating optical system forms, on the reflecting film, a plurality of optical images that is formed on the reflective polarizing plate by the second polarized light of the plurality of luminous fluxes that passed through the transmission region.

Figure 1:
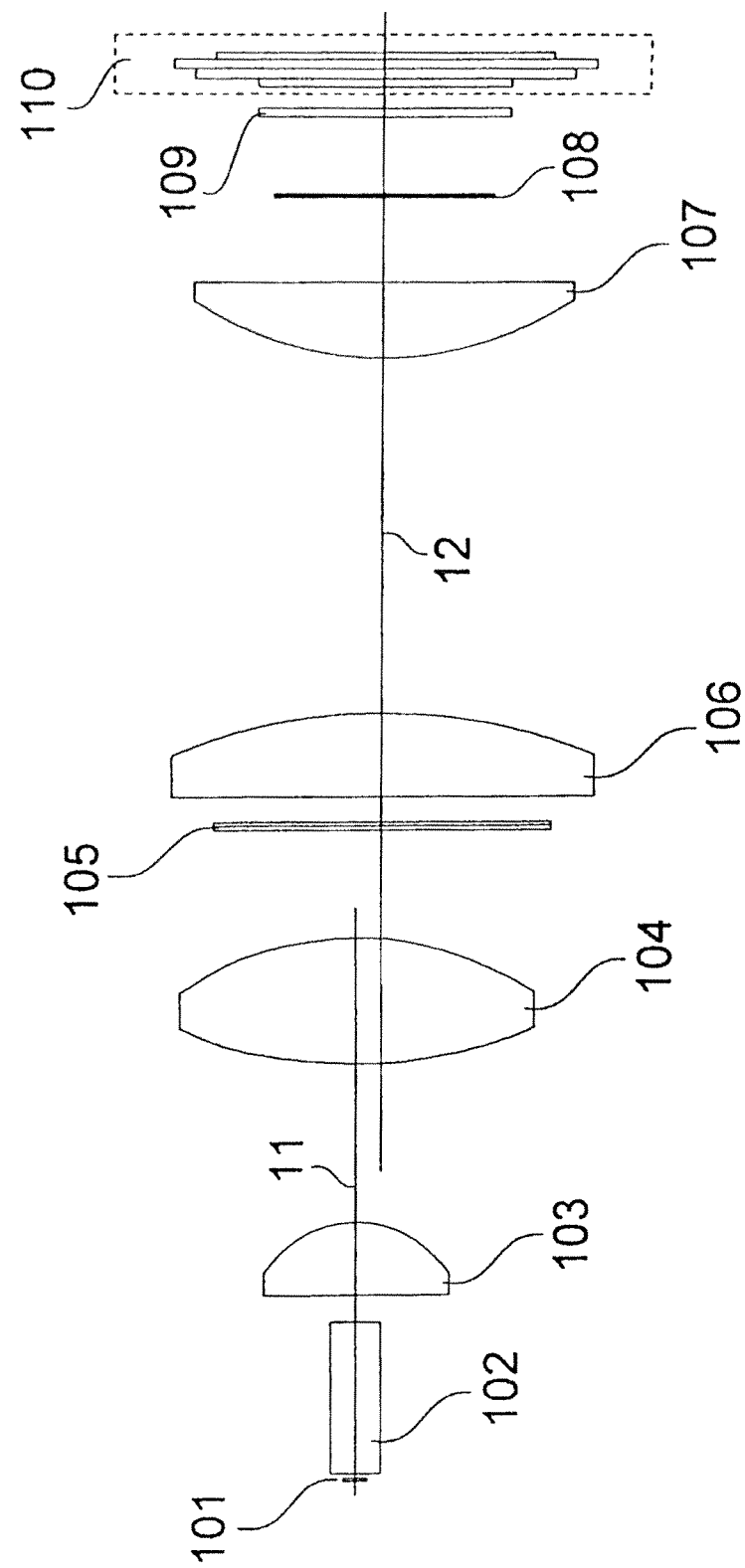
FIG. 1 is a schematic view showing a configuration of an illumination device according to a first exemplary embodiment of the present invention.

EXPLANATION OF REFERENCE NUMERALS 101 light source
102 light guiding rod
103, 104, 106, 107 illumination lens
105 reflecting element
108 phase plate
109 reflective polarizing plate
110 display element

DESCRIPTION OF EMBODIMENTS

Next, exemplary embodiments of the present invention are described with reference to the accompanying drawings.

First Exemplary Embodiment

FIG. 1 is a schematic view showing a configuration of an illumination device according to a first exemplary embodiment of the present invention.

As shown in FIG. 1, the illumination device according to the present embodiment, which illuminates display element 110 having reflective polarizing plate 109, includes, in addition to reflective polarizing plate 109, light source 101, light guiding rod 102, illumination lenses 103, 104, 106, and 107, reflecting element 105, and phase plate 108.

Reflective polarizing plate 109 is, for example, a polarizing plate of a wire-grid type, and configured to transmit, among incident lights, first polarized light (e.g., p-polarized light) while reflecting second polarized light (e.g., s-polarized light) that is different from the first polarized light in a direction (toward reflecting element 105) opposite an incident direction.

Display element 110 includes, for example, a liquid crystal panel. For both reflective polarizing plate 109 and display element 110, commercially available products can be used. As display element 110, for example, a transmissive liquid crystal panel having a diagonal of 1.0 inch can be used.

It is preferable that reflective polarizing plate 109 be located near a display surface (panel surface) of display element 110. Reflective polarizing plate 109 can be formed integrally with display element 110. For example, when the liquid crystal panel is used as display element 110, reflective polarizing plate 109 can be formed integrally with a substrate of an incident side of the liquid crystal panel.

Light source 101 is a solid light source represented by, for example, a LED. Light from light source 101 is supplied to one end surface (incident surface) of light guiding rod 102. A center (light emitting center) of a light emitting part of light source 101 is located on an axis (center axis) that passes through a center (center of gravity) of a section of light guiding rod 102.

The area of the incident surface of light guiding rod 102 is larger than that of the light emitting part of light source 101. For example, when a LED having a light emitting part of 4 mm×3 mm is used for light source 101, as light guiding rod 103, for example, a square rod having a section of 8 mm×3 mm and a length of 20 millimeters is used.

Light guiding rod 102 can be formed by using an inexpensively available BK7 made of glass. As a material for light guiding rod 102, the optical glass or the optical plastic can be used. Light guiding rod 102 can be hollow types where centers are cavities, or solid types that do not have any such cavities.

So that a greater amount of light can enter light guiding rod 102 from light source 101, it is preferable that the distance between the light emitting part of light source 101 and light guiding rod 102 be set as small as possible. Specifically, the distance between light guiding rod 102 and light source 101 is 0.7 millimeters.

Illumination lenses 103 and 104, reflecting element 105, illumination lenses 106 and 107, phase plate 108, reflective polarizing plate 109, and display element 110 are arranged in this order in the traveling direction of light output from the other end surface (exit surface) of light guiding rod 102.

The optical image formed on the exit surface of light guiding rod 102 is formed on the display surface of display element 110 by an illumination lens group including illumination lenses 103, 104, 106, and 107. Illumination lenses 103, 104, 106, and 107 all have spherical shapes on one surface or on both surfaces. However, aspherical lenses can be used.

Optical axes of illumination lenses 103 and 104 match the center axis of light guiding rod 102. Centers (centers of gravity) of reflecting element 105, phase plate 108, reflective polarizing plate 109, and display element 110 are located on optical axis 12 of illumination lenses 106 and 107. When seen from a direction vertical to the plane that intersects optical axis 11 of illumination lenses 103 and 104 and optical axis 12 of illumination lenses 106 and 107, optical axis 11 is shifted with respect to optical axis 12.

Eccentricity (shifting amount) of the optical axis (similar to optical axis 11) that passes through the center of gravity of each of light guiding rod 102 and illumination lenses 103 and 104 with respect to the axis (similar to optical axis 12) that passes through the center of gravity of each of illumination lenses 106 and 107, reflecting element 105, phase plate 108, reflective polarizing plate 109, and display element 110 is, for example, 3 millimeters. The eccentricity is not limited to 3 millimeters. However, the larger the eccentricity the larger are reflecting element 105, phase plate 108, reflective polarizing plate 109, and display element 110.

A luminous flux output from the exit surface of light guiding rod 102 is spatially separated into a plurality of luminous fluxes by illumination lenses 103 and 104. The number of separated luminous fluxes is determined by the number of times of reflecting the light incident on light guiding rod 102 from light source 101 on its inner surface.

Reflecting element 105, which reflects light (e.g., s-polarized light) from reflective polarizing plate 109 toward reflective polarizing plate 109, is disposed at a position where the luminous flux from the exit surface of light guiding rod 102 is spatially separated. Specifically, reflecting element 105 is located between illumination lenses 104 and 106.

Figure 2:
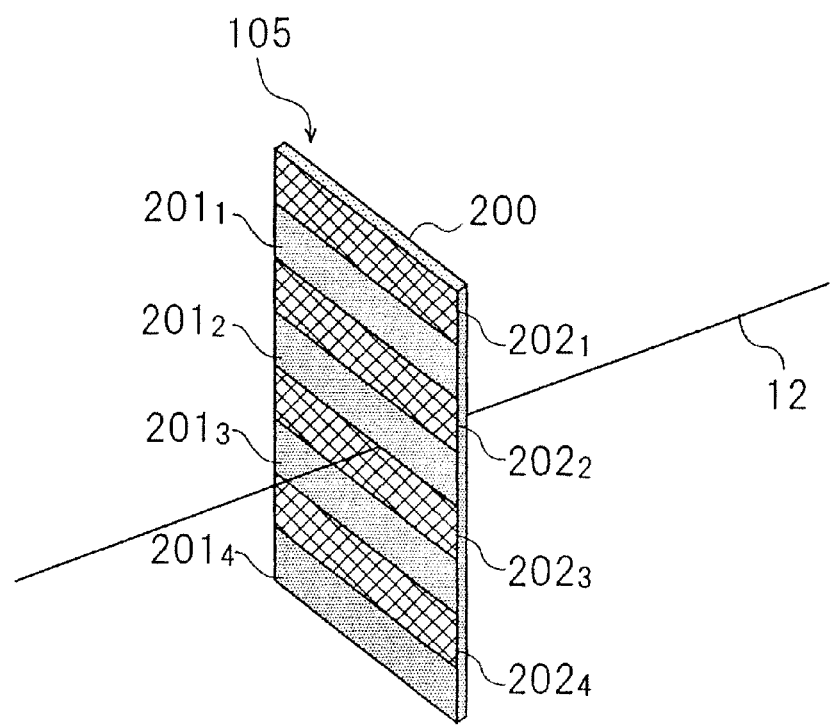
FIG. 2 is a schematic view showing a configuration of a reflecting element of the illumination device shown in FIG. 1.

FIG. 2 is a schematic view showing reflecting element 105. Referring to FIG. 2, reflecting element 105 includes a plurality of belt-shaped reflecting films $202_1$ to $202_4$ formed on, for example, glass substrate 200 having a thickness of about 1 millimeter, by aluminum deposition. Reflecting films $202_1$ to $202_4$ are formed in regions other than transmission regions $201_1$ to $201_4$ through which the luminous fluxes separated by illumination lenses 103 and 104 are transmitted. Reflecting films $202_1$ to $202_4$ and transmission regions $201_1$ to $201_4$ are alternately arranged. Reflecting films $202_1$ to $202_4$ can be dielectric multilayer films. The center of gravity of reflecting film 105, which is at the center of a boundary line between reflecting films $202_3$ and $202_2$, is located on optical axis 12.

In the position of reflecting film 105, a plurality of optical images (virtual images) of the exit surface of light guiding rod 102 is formed. Each optical image corresponds to each separated luminous flux, and has a width of about 5 millimeters in a vertical direction. In the vertical direction, the width of a region (region where no optical image is formed) between the optical images is also about 5 millimeters.

In the position of reflecting film 105, a plurality of optical images (virtual images) of images (images corresponding to the optical images of the exit surface of light guiding rod 102) formed on reflective polarizing plate 109 by the second polarized light is formed. Each optical image has a width of about 5 millimeters in the vertical direction. In the vertical direction, the width of a region (region where no optical image is formed) between the optical images is also about 5 millimeters.

Corresponding to the optical images (virtual images), reflecting films $202_1$ to $202_4$ are set to about 5 millimeters in width, and reflecting films $202_1$ to $202_4$ are set to about 5 millimeters in interval (pitch).

In FIG. 2, the reflecting films are shown to be uniform in width and interval. However, they may not always be uniform. The number of reflecting films is not limited to four. The number, widths, and intervals of reflecting films are determined based on the number of luminous fluxes output from the exit surface of light guiding rod 102 and sizes of the luminous fluxes.

Phase plate 108 is a ¼ wavelength plate located between illumination lens 107 and reflective polarizing plate 109. The location of phase plate 108 is not limited between illumination lens 107 and reflective polarizing plate 109. Phase plate 108 can be located anywhere between reflecting element 105 and reflective polarizing plate 109.

In the configuration shown in FIG. 1, phase plate 108 is disposed independently of the other members. However, the arrangement is not limited to this. The surface of illumination lens 107 on display element 110 side is a plane. Phase plate 108 can be bonded to the plane. This configuration enables common use of the glass substrate. Thus, the number of components can be reduced.

Phase plate 108 can be formed integrally with reflecting element 105. For example, phase plate 108 can be bonded to the surface of glass substrate 200 shown in FIG. 2 opposite the surface where reflecting films $202_1$ to $202_4$ are formed. This configuration also enables reduction of the number of components.

In the illumination device shown in FIG. 1, the illumination lens group includes four illumination lenses 103, 104, 106, and 107. However, the number is not limited to four. The illumination lens group can employ any lens configuration as long as the optical image formed on the exit surface of light guiding rod 102 can be formed on the display surface of display element 110. It is more preferable that optical parameters (curvature radius, interval, and relationship between optical axes 11 and 12) of illumination lenses 103, 104, 106, and 107 be set so that: the optical image formed on the exit surface of light guiding rod 102 is formed on the display surface of display element 110; the luminous flux from the exit surface of light guiding rod 102 are spatially separated; and at the separation position of the luminous fluxes, reflected light from reflective polarizing plate 109 is returned to the region between the separated luminous fluxes.

Next, the operation of the illumination device according to the present embodiment is described in detail.

Figure 3:
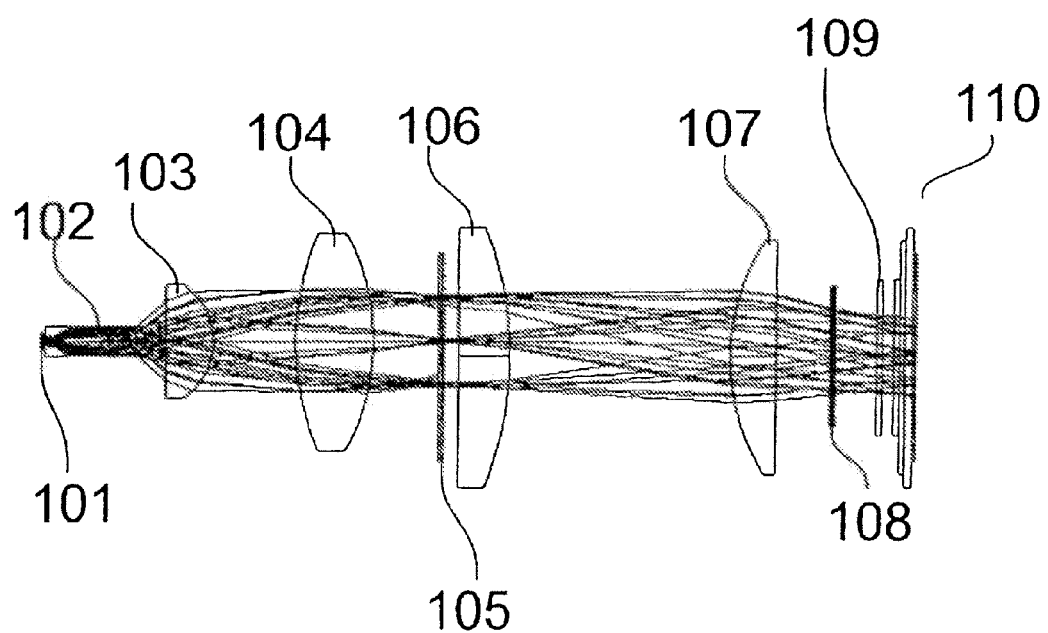
FIG. 3 is a schematic view showing a result of ray-tracing a process where a luminous flux from a light source reaches a display element in the illumination device shown in FIG. 1.

FIG. 3 is a schematic view showing the result of ray-tracing a process where a luminous flux from light source 101 reaches display element 110 in the configuration shown in FIG. 1.

Referring to FIG. 3, unpolarized light from light source 101 enters light guiding rod 102. In light guiding rod 102, the entered unpolarized light is repeatedly reflected on a rod inner surface to be propagated, and reaches the exit surface. During the propagation process in the rod, luminance is made uniform. When there is luminance unevenness in light emission of light source 101, through uniformization of luminance by light guiding rod 102, uniform illuminance distribution is formed on the exit surface of light guiding rod 102.

Illumination information (rectangular light source image) formed on the exit surface of light guiding rod 102 is formed on the display surface (panel surface) of display element 110 by the illumination lens group including illumination lenses 103, 104, 106, and 107.

A luminous flux of the unpolarized light output from the exit surface of light guiding rod 102 is spatially separated into a plurality of luminous fluxes by illumination lenses 103 and 104. The number of luminous fluxes separated by illumination lenses 103 and 104 is determined based on the number of reflecting times during the propagation process in light guiding rod 102.

In FIG. 3, the light output from light guiding rod 102 is separated into three luminous fluxes. Of lights that enter light guiding rod 102 from light source 101, only the middle flux, from among three separated fluxes, is light that is output from light guiding rod 102 without being reflected on the inner surface of the light guiding rod.

Reflecting element 105 is located so that the luminous fluxes separated by illumination lenses 103 and 104 can pass through three of transmission regions $201_1$ to $201_4$ shown in FIG. 2. In other words, the three separated luminous fluxes pass through reflecting element 105 with almost no influence of light loss caused by, for example, shielding by reflecting films $202_1$ to $202_4$.

The separated luminous fluxes that passed through reflecting element 105 are superimposed by illumination lenses 106 and 107, and then pass through phase plate 108 to reach reflective polarizing plate 109.

At reflective polarizing plate 109, among the luminous fluxes (unpolarized light) that passed through phase plate 108, first linear polarized light (e.g., p-polarized light) is transmitted while second linear polarized light (e.g., s-polarized light) is reflected toward phase plate 108.

The first linear polarized light that passed through reflective polarizing plate 109 is applied to the display surface (panel surface) of display element 110. Illuminating display element 110 with the first linear polarized light among the luminous fluxes superimposed by illumination lenses 106 and 107 enables illumination of a uniform illuminance distribution.

On the other hand, the second linear polarized light (s-polarized light) reflected by reflective polarizing plate 109 passes through phase plate 108, and is then applied to three of reflecting films $202_1$ to $202_4$ of reflecting element 105 via illumination lenses 106 and 107. At the reflecting element 105, reflected light (s-polarized light) from reflective polarizing plate 109 is reflected by the reflecting film toward reflective polarizing plate 109.

Figure 4:
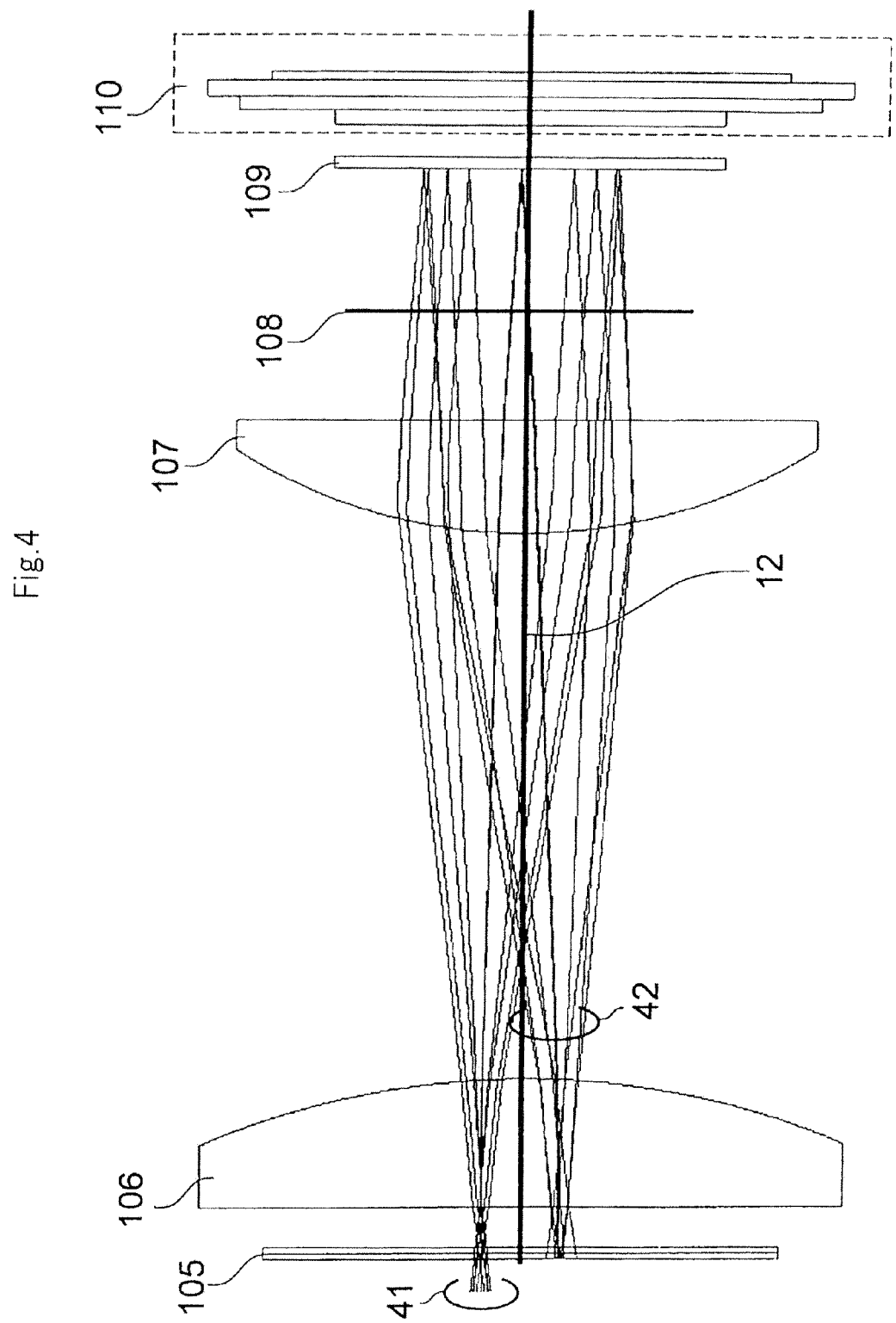
FIG. 4 is a schematic view showing a result of ray-tracing a process where one of luminous fluxes separated by an illumination lens reaches a reflective polarizing plate, a process where light reflected by the reflective polarizing plate reaches the reflecting element, and a process where light reflected by the reflecting element reaches the reflective polarizing plate in the illumination device shown in FIG. 1.

FIG. 4 is a schematic view showing the result of ray-tracing a process where one of the luminous fluxes separated by illumination lenses 103 and 204 reaches reflective polarizing plate 109, a process where the light reflected by reflective polarizing plate 109 reaches reflecting element 105, and a process where the light reflected by reflecting element 105 reaches reflective polarizing plate 109.

In FIG. 4, separated luminous flux 441 is, among the lights that entered from light source 101 to light guiding rod 102, a luminous flux (the middle flux from among the three separated luminous fluxes shown in FIG. 3) output from light guiding rod 102 without being reflected on the rod inner surface.

Separated luminous flux 41 is transmitted through reflecting element 105. The region (transmission region $201_2$ shown in FIG. 2) of reflecting element 105 through which separated luminous flux 41 is transmitted is shifted from optical axis 12. In the example shown in FIG. 4, the region through which separated luminous flux 41 is transmitted is located above optical axis 12.

Separated luminous flux 41 passed through reflecting element 105 is condensed by illumination lenses 106 and 107, and then passes through phase plate 108 to reach reflective polarizing plate 109. Separated luminous flux 41 is unpolarized light at the time of passage through reflecting element 105, and is still unpolarized light even after passage through phase plate 108.

First polarized light of separated luminous flux 41 that passed through phase plate 108 is transmitted through reflective polarizing plate 109, while second polarized light is reflected toward phase plate 108 by reflective polarizing plate 109.

The second polarized light reflected by reflective polarizing plate 109 is passed through phase plate 108 to reach illumination lens 107 as circular polarized light. The luminous flux from phase plate 108 is magnified by illumination lenses 106 and 107 to be applied as luminous flux 42 to reflecting film (reflecting film $202_3$ shown in FIG. 2) of reflecting element 105.

When seen from a direction (direction of optical axis 12) vertical to the incident surface (or exit surface) of reflecting element 105, the region (transmission region $201_2$ that is shown in FIG. 2) through which separated luminous flux 41 is transmitted and the region (reflecting film $202_3$ that is shown in FIG. 2) irradiated with luminous flux 42 are in a point-symmetric positional relationship with each other with optical axis 12 as the reference.

At reflecting element 105, luminous flux 42 is reflected toward reflective polarizing plate 109 by reflecting film $202_3$. The luminous flux (circular polarized light) reflected by reflecting film $202_3$ is condensed by illumination lenses 106 and 107, and then passes through phase plate 108 to reach reflective polarizing plate 109.

The reflected luminous flux (circular polarized light) from reflecting element 105 is converted into first polarized light (p-polarized light) by phase plate 108. The first polarized light (p-polarized light) from phase plate 108 is transmitted through reflective polarizing plate 109 to reach display element 110.

In the example shown in FIG. 4, only the ray path for separated luminous flux 41 is shown. Similarly, for other separated luminous fluxes, first linear polarized light (p-polarized light) is transmitted through reflective polarizing plate 109, while second linear polarized light (s-polarized light) is reflected by reflective polarizing plate 109 to return to reflecting element 105. Then, the luminous flux reflected by reflecting element 105 is passed through phase plate 108 to reach reflective polarizing plate 109.

According to the illumination device of the present embodiment, most of the light reflected by reflective polarizing plate 109 reaches the reflecting film of reflecting element 105. This is achieved by the following first to third conditions.

The first condition is that the exit surface of light guiding rod 102 and the display panel (panel surface) of display element 110 located on both sides (incident side and exit side) of the lens group including illumination lenses 103, 104, 106, and 107 be in a conjugate relationship with each other, and that reflective polarizing plate 109 be located near the display surface of display element 110. The second condition is that the light emitting center of light source 101 be located on the center axis of light guiding rod 102. The third condition is that the center axis of light guiding rod 102 match optical axis 11 of illumination lenses 103 and 104, and that optical axis 12 of illumination lenses 106 and 107 be shifted with respect to optical axis 11 of illumination lenses 103 and 104.

Thus, reflecting most of the light reflected by reflective polarizing plate 109 toward reflective polarizing plate 109 by reflecting element 105 to reuse it enables improvement of light use efficiency.

Reflecting film 105 is formed into a structure that includes: transmission regions through which the spatially separated luminous fluxes are transmitted; and a reflecting film which is formed in a region other than the transmission regions and which reflects the light from the reflective polarizing plate. The reflecting film can be formed by deposition, and hence the pitch between the transmission region and the reflecting film can be easily set to about 1 millimeter. Thus, the problem in which it is difficult to achieve miniaturization in the PBS polarizing conversion can be solved, and the illumination device can be miniaturized.

Each reflecting film of reflecting element 105 is located in the space between the luminous fluxes spatially separated by illumination lenses 103 and 104, and hence most of the separated luminous fluxes pass through reflecting element 105. Thus, light use efficiency can be further increased.

In reflecting element 105 shown in FIG. 4, the reflecting film is belt-shaped. However, the reflecting film is not limited to this shape. In reflecting element 105, a plurality of optical images (virtual images) of images (images corresponding to the optical images on the exit surface of light guiding rod 102) formed on reflective polarizing plate 109 by the second polarized light are formed. Reflecting films can be formed only in the regions where these optical images (virtual images) are formed.

When the reflecting film of reflecting element 105 is belt-shaped, it is preferable that when seen from the direction vertical to the surface of reflecting element 105, the longitudinal direction of the reflecting film intersect the eccentric direction (shifting direction) of optical axis 12 with respect to optical axis 13.

As long as the luminous flux from light guiding rod 102 passes through reflecting element 105, and at least a part of the light from reflective polarizing plate 109 is reflected by reflecting element 105 toward reflective polarizing plate 109, reflecting element 105 can be disposed in any position of the illumination lens group. However, depending on the position of reflecting element 105, the ratio of the light amount returned to reflective polarizing plate 109 with respect to the light amount from reflective polarizing plate 109 decreases, thereby halving the light use efficiency improvement effect. It is preferable that reflecting element 105 be located so that the light from light guiding rod 102 can be sufficiently separated spatially and the width of the region between the separated luminous fluxes can be equal to or more than the width of the separated luminous flux. Thus, the light use efficiency improvement effect can be exhibited to the maximum.

Light source 101 can be other than the LED. For example, a lamp using arc discharging can be used as light source 101. In this case, a condenser lens for entering light from the lamp to the incident surface of light guiding rod 102 is used.

The illuminating optical system includes four illumination lenses 103, 104, 106, and 107. However, the illuminating optical system is not limited to this configuration. The illuminating optical system can employ any configuration as long as the optical image formed on the exit surface of light guiding rod 102 can be formed on the display surface of display element 110, the luminous flux from the exit surface of light guiding rod 102 can be spatially separated and, at the position where the luminous fluxes are separated, reflected light from reflective polarizing plate 109 can be returned to the region between the separated luminous fluxes. The illuminating optical system can include other optical members in addition to the illumination lenses Second Exemplary Embodiment FIG. 5 is a schematic view showing the configuration of an illumination device according to a second exemplary embodiment of the present invention.

Figure 5:
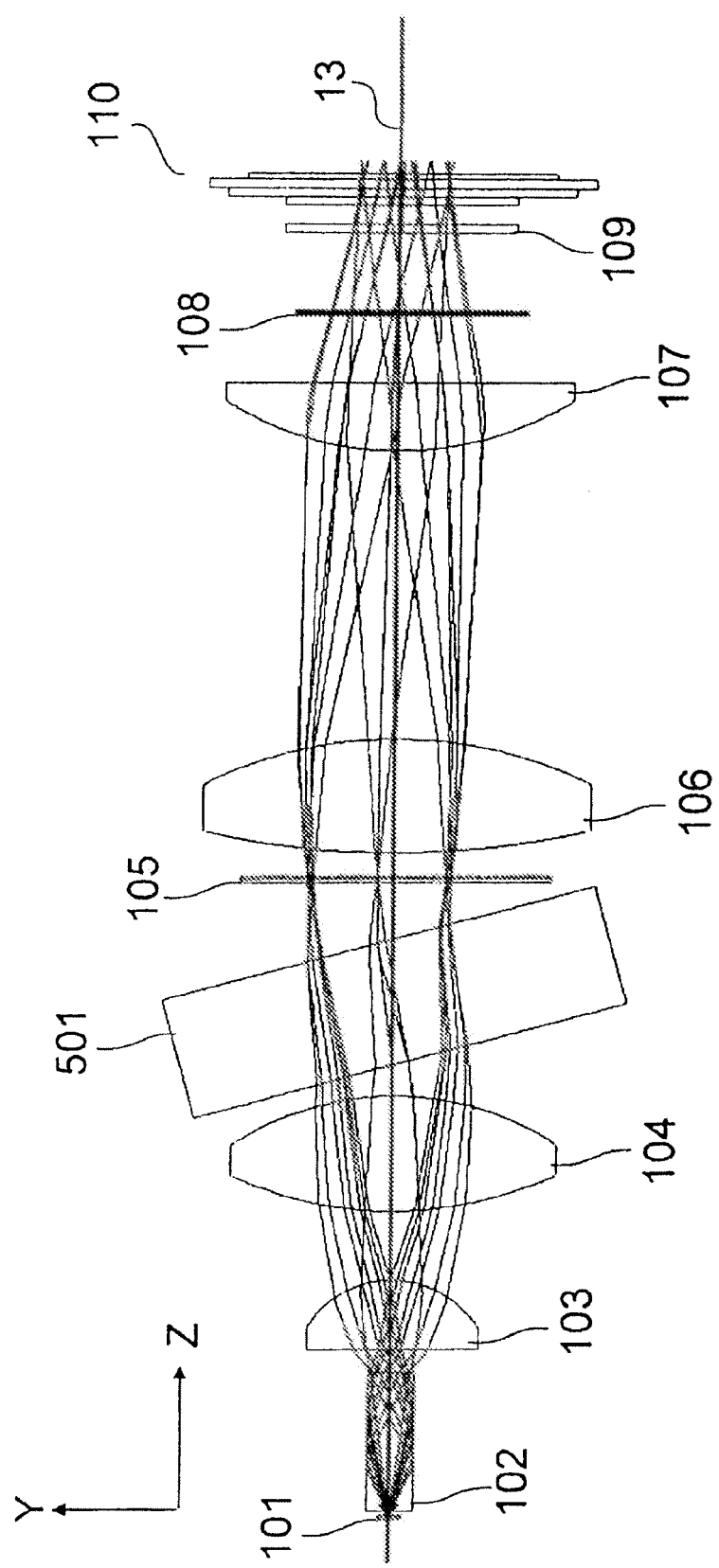
FIG. 5 is a schematic view showing a configuration of an illumination device according to a second exemplary embodiment of the present invention.

As shown in FIG. 5, the illumination device according to the present embodiment includes the configuration in which parallel plate 501 is added to the configuration of the first exemplary embodiment. This illumination device is different in configuration from that of the first exemplary embodiment because of the addition of parallel plate 501 to the illuminating optical system including illumination lenses 103, 104, 106, and 107, and because of the relationship between the center axis of light guiding rod 102 and the optical axis (coaxis) of the illuminating optical system. Others are basically similar to those of the first exemplary embodiment.

The light emitting center of light source 101 is located on the center axis of light guiding rod 102. The center axis of light guiding rod 102 matches the optical axis of illumination lenses 103 and 104, and the optical axis of illumination lenses 103 and 104 matches that of illumination lenses 106 and 107. Centers of gravity of reflecting element 105, phase plate 108, reflective polarizing plate 109, and display element 110 are located on optical axis 13 of illumination lenses 103, 104, 106, and 107.

Parallel plate 501 is located between illumination lens 104 and reflecting element 105 obliquely to optical axis 13. Parallel plate 501 can be made of glass or a resin. For example, glass parallel plate 501 having a thickness of 15 millimeters can be disposed at a tilting angle of 15 degrees to optical axis 13. However, the thickness and the tilting angle of parallel plate 501 are not limited to such values.

Next, referring to FIG. 5, an operation of the illumination device according to the present embodiment is described. FIG. 5 schematically shows, as an example, the result of ray-tracing a process where the luminous flux from light source 101 reaches display element 110.

Unpolarized light from light source 101 enters light guiding rod 102. In light guiding rod 102, the entered unpolarized light is repeatedly reflected on a rod inner surface to be propagated, and reaches the exit surface. A uniform illuminance distribution is formed on the exit surface of light guiding rod 102.

Illumination information (rectangular light source image) formed on the exit surface of light guiding rod 102 is formed on the display surface (panel surface) of display element 110 by the illumination lens group including illumination lenses 103, 104, 106, and 107.

The luminous flux of the unpolarized light output from the exit surface of light guiding rod 102 is spatially separated into a plurality of luminous fluxes by illumination lenses 103 and 104. The number of luminous fluxes separated by illumination lenses 103 and 104 is determined based on the number of reflecting times during the propagation process in light guiding rod 102. In FIG. 5, as in the example shown in FIG. 3, the light output from light guiding rod 102 is separated into three luminous fluxes.

The luminous fluxes separated by illumination lenses 103 and 104 are passed through parallel plate 501, and then enter reflecting element 105. Parallel plate 501 works to shift the incident region of each separated luminous flux of reflecting element 105 in the arraying direction (direction intersecting longitudinal direction of the reflecting films) of belt-shaped reflecting films $202_1$ to $202_4$ shown in FIG. 2. Thus, each separated luminous flux passes, without any influence of light loss caused by, for example, shielding by reflecting films $202_1$ to $202_4$, one of transmission regions $201_1$ to $201_4$ of reflecting element 105. When seen from a direction vertical to the surface of reflecting element 105, the longitudinal direction of reflecting films $202_1$ to $202_4$ intersects the shifting direction of parallel plate 501.

The separated luminous fluxes that passed through reflecting element 105 are superimposed by illumination lenses 106 and 107, and then pass through phase plate 108 to reach reflective polarizing plate 109.

At reflective polarizing plate 109, among the luminous fluxes (unpolarized light) that passed through phase plate 108, first linear polarized light (e.g., p-polarized light) is transmitted while second linear polarized light (e.g., s-polarized light) is reflected toward phase plate 108.

The first linear polarized light passed through reflective polarizing plate 109 is applied to the display surface (panel surface) of display element 110. Illuminating display element 110 with the first linear polarized light among the luminous fluxes superimposed by illumination lenses 106 and 107 enables illumination of a uniform illuminance distribution.

On the other hand, the second linear polarized light (s-polarized light) reflected by reflective polarizing plate 109 passes through phase plate 108, and is then applied to three of reflecting films $202_1$ to $202_4$ of reflecting element 105 via illumination lenses 106 and 107. At reflecting element 105, reflected light from reflective polarizing plate 109 is reflected by the reflecting film toward reflective polarizing plate 109.

The luminous flux (circular polarized light) from reflecting element 105 is condensed by illumination lenses 106 and 107, and then passes through phase plate 108 to reach reflective polarizing plate 109.

The luminous flux (circular polarized light) from reflecting element 105 is converted into first polarized light (p-polarized light) by phase plate 108. The first polarized light (p-polarized light) from phase plate 108 is passed through reflective polarizing plate 109 to reach display element 110.

According to the illumination device of the present embodiment, most of the light reflected by reflective polarizing plate 109 reaches the reflecting film of reflecting element 105. This is achieved by the following first to third conditions.

The first condition is that the exit surface of light guiding rod 102 and the display panel (panel surface) of display element 110 located on both sides (incident side and exit side) of the illuminating optical system including illumination lenses 103, 104, 106, and 107 be in a conjugate relationship with each other, and that reflective polarizing plate 109 be located near the display surface of display element 110. The second condition is that the light emitting center of light source 101 be located on the center axis of light guiding rod 102. The third condition is that the center axis of light guiding rod 102 match optical axis 13 of the illuminating optical system, and that parallel plate 501 be located on the incident surface side of reflecting element 105.

Thus, reflecting most of the light reflected by reflective polarizing plate 109 toward reflective polarizing plate 109 by reflecting element 105 to reuse it provides the same effects as those of the first exemplary embodiment.

As described above, according to the embodiment of the present invention, the illumination device includes: the light source; the light guiding means where the light from the light source is supplied to one end surface, and the light incident from the one end surface is propagated inside to exit from the other end surface; the illuminating optical system that spatially separates the luminous flux output from the other end surface of the light guiding means into the plurality of luminous fluxes, and that forms, on the display element, the optical image formed on the other end surface of the light guiding means; the reflective polarizing plate that is located between the illuminating optical system and the display element, and that transmits the first polarized light while reflecting the second polarized light different in polarized state from the first polarized light toward the illuminating optical system; the reflecting element that is disposed at the position where the plurality of luminous fluxes are spatially separated, and that reflects the light reflected by the reflective polarizing plate toward the reflective polarizing plate; and the phase plate that is located between the reflecting element and the reflective polarizing plate. The reflecting element includes the transmission region through which the plurality of luminous fluxes are transmitted, and the reflecting film that is formed in the region other than the transmission region. The light emitting center of the light source is located on the center axis that passes through the center of gravity of both end surfaces of the light guiding means. The illuminating optical system forms, on the reflecting film, the plurality of optical images that is formed on the reflective polarizing plate by the second polarized light of the plurality of luminous fluxes that passed through the transmission region.

According to the illumination device, most of the light reflected by the reflective polarizing plate can be reflected toward the reflective polarizing plate by the reflecting element to be reused. Thus, light use efficiency can be improved.

The reflecting element includes the configuration in which the reflecting film is formed on the glass substrate by deposition, and the pitch of such a reflecting film can be easily set to about 1 millimeter. Thus, the problem in which it is difficult to achieve miniaturization in the PBS polarizing conversion can be solved, and the illumination device can be miniaturized.

In the illumination device, the illuminating optical system can include: a first lens group that is located between the light guiding means and the reflecting element, and that separates the luminous flux output from the other end surface of the light guiding means into the plurality of luminous fluxes; and a second lens group that condenses the plurality of luminous fluxes that passed through the reflecting element on the display element. In this case, when seen from a direction vertical to the plane that intersects both optical axes of the first and second lens groups, the optical axis of the first lens group can be shifted with respect to that of the second lens group. An example of this configuration is the first exemplary embodiment.

In this case, the reflecting film can be formed into a striped shape and, when seen from a direction vertical to the surface of the reflecting element, the longitudinal direction of the reflecting film can intersect the shifting direction of the optical axis of the first lens group with respect to that of the second lens group.

In the illumination device, the illuminating optical system can include: a first lens group that is located between the light guiding means and the reflecting element, and that separates the luminous flux output from the other end surface of the light guiding means into the plurality of luminous fluxes; a second lens group that condenses, on the display element, the plurality of luminous fluxes that passed through the reflecting element; and a parallel plate that is located between the reflecting element and the first lens group, and that shifts an incident position of the plurality of luminous fluxes on the reflecting element. In this case, the optical axis of the first lens group can match that of the second lens group. An example of this configuration is the second exemplary embodiment.

In this case, the reflecting film can be formed into a striped shape and, when seen from a direction vertical to the surface of the reflecting element, the longitudinal direction of the reflecting film can intersect the shifting direction of the parallel plate.

Next, a configuration of a projection type display device that uses the illumination device of the present invention is described.

Figure 6:
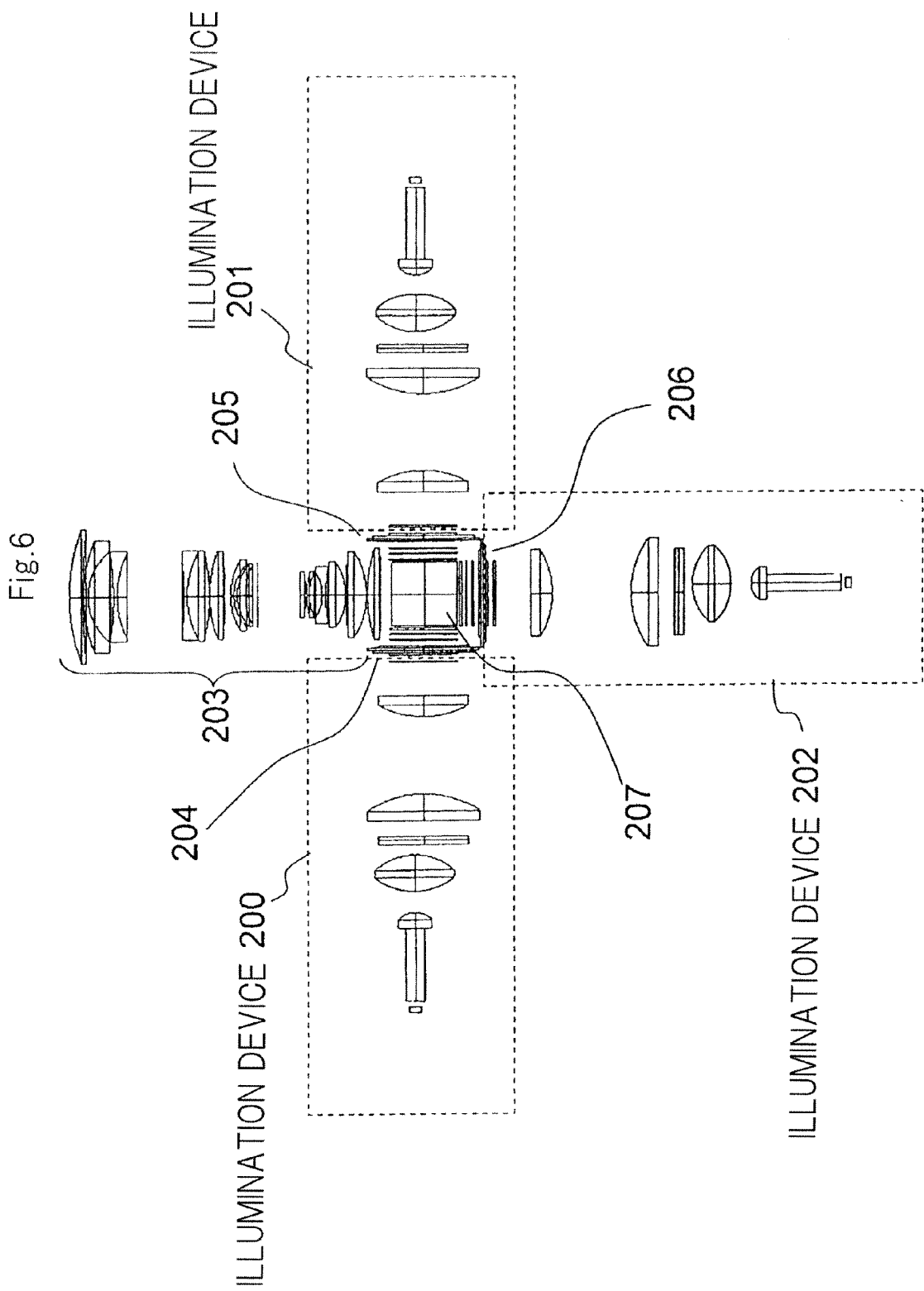
FIG. 6 is a schematic view showing a configuration of a projection type display device that includes the illumination device according to the present invention.

FIG. 6 shows the configuration of the projection type display device that includes the illumination device of the present invention.

The projection type display device shown in FIG. 6 is a three-plate liquid crystal projector, the main portion of which includes illumination devices 200 to 202, projection optical system 203, liquid crystal panels 204 to 206, and cross dichroic prism 207.

Illumination devices 200 to 202 are similar in configuration to the illumination device according to the first exemplary embodiment. For the light source of illumination device 200, a light source that has a peak wavelength in a blue wavelength band is used. For the light source of illumination device 201, a light source that has a peak wavelength in a red wavelength band is used. For the light source of illumination device 202, a light source that has a peak wavelength in a green wavelength band is used. The blue, green, and red colors correspond to three primary colors of light.

Liquid crystal panel 204 is illuminated with colored light (blue) of predetermined polarized light (p or s-polarized light) output from illumination device 200. Liquid crystal panel 205 is illuminated with colored light (red) of predetermined polarized light (p or s-polarized light) output from illumination device 201. Liquid crystal panel 206 is illuminated with colored light (green) of predetermined polarized light (p or s-polarized light) output from illumination device 202.

Cross dichroic prism 207 is located at the intersection point of optical axes of illumination devices 200 to 202. Cross dichroic prism 207 includes a first incident surface which image light (blue) from liquid crystal panel 204 enters, a second incident surface which image light (red) from liquid crystal panel 205 enters, a third incident surface which image light (green) from liquid crystal panel 206 enters, and an exit surface from which color synthesized image light that synthesizes colors of the image lights (red, green, and blue) incident from the incident surfaces exit.

Projection optical system 203 projects the color synthesized image light from cross dichroic prism 207 onto a screen (not shown). The pupil of projection optical system 203 is set in the focal position of each of the optical systems (illumination lenses 103, 104, 106, and 107) of illuminating lenses 200 to 202. In other words, the optical system of each of illumination devices 200 to 202 and projection optical system 203 constitute a telecentric system.

Figure 7:
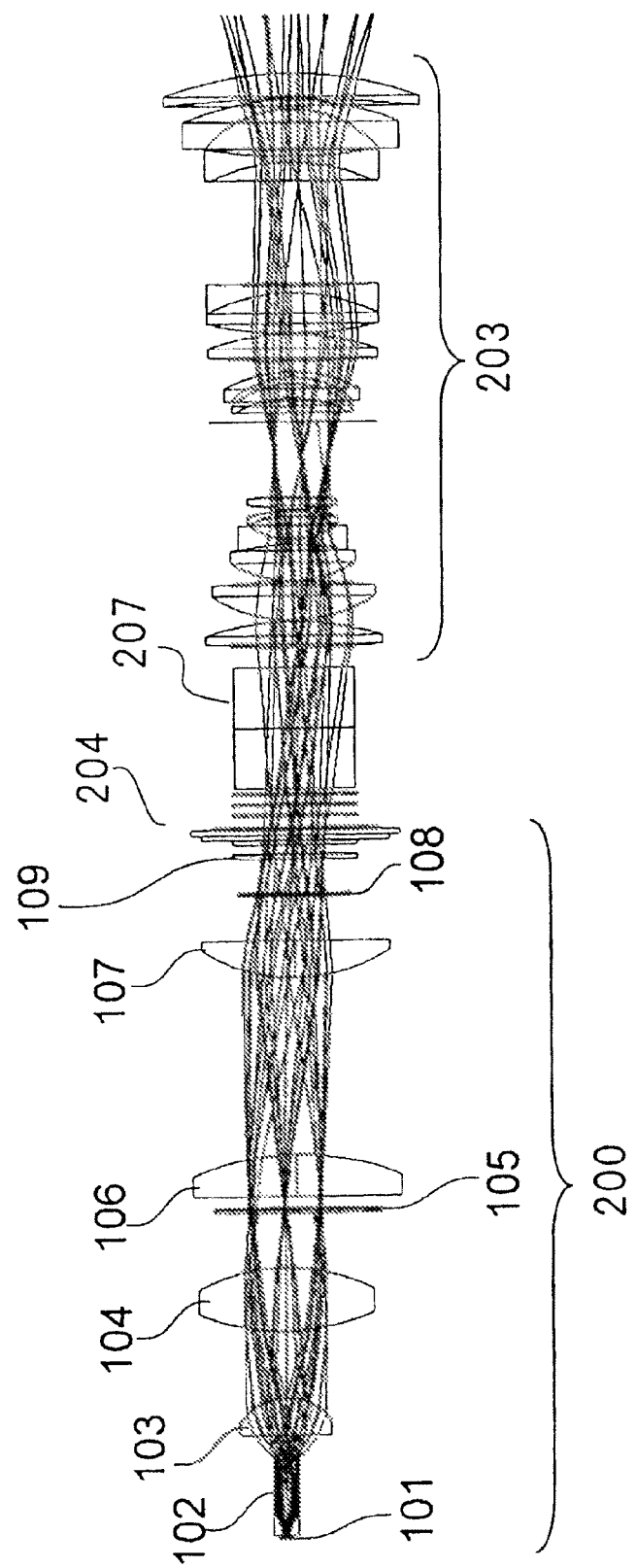
FIG. 7 is a schematic view showing a result of ray-tracing a path of, among lights directed from a light source to a display panel, light of a linear polarized component transmitted through a reflective polarizing plate in a system including a green illumination device, a liquid crystal panel, a cross dichroic prism, and an projection optical system in the projection type display device shown in FIG. 6.

FIG. 7 shows the result of ray-tracing a path of, among lights directed from light source 101 to liquid crystal panel 204, light of a linear polarized component transmitted through reflective polarizing plate 109 in a system including illumination device 200, liquid crystal panel 204, cross dichroic prism 207, and projection optical system 203. As shown in FIG. 7, the light of the linear polarized component that passed through reflective polarizing plate 109 is applied to liquid crystal panel 204 to be used as image projection light.

Though not shown in FIG. 7, the light reflected by reflective polarizing plate 109 efficiently returns to the reflecting film of reflecting element 105. Reflected light from reflective polarizing plate 109 is reflected toward reflective polarizing plate 109 by the reflecting film of reflecting element 105. The reflected light from reflecting element 105 is transmitted through reflective polarizing plate 109 to be applied to liquid crystal panel 204, and is used as image projection light.

The light reflected by reflective polarizing plate 109 can be efficiently used as the image projection light. Thus, overall polarizing conversion efficiency can be improved.

Operations of illumination devices 201 and 202 are similar to that of illumination device 200.

According to the projection type display device of the present embodiment, each illumination device illuminates each liquid crystal panel with highly efficient illumination light. Thus, a bright projected image can be acquired, and a projected image of high color reproducibility can be acquired.

For illumination devices 200 to 202, the illumination device according to the second exemplary embodiment can be used.

The illumination device of the present invention can be applied to a single-plate liquid crystal projector. The main portion of the single-plate liquid crystal projector includes an illumination device, a liquid crystal panel illuminated with light from the illumination device, and a projection optical system that projects image light from the liquid crystal panel onto a screen. For example, each pixel of the liquid crystal panel includes a color filter of red, green, or blue. This enables full-color displaying. In this case, the displaying/nondisplaying operation at each pixel is carried out in time division for each color.

The illumination device and the projection type display device described above are only examples of the present invention. The configurations thereof can be appropriately changed without departing from the spirit and scope of the present invention.

The invention claimed is:

1. An illumination device comprising:
    a light source;
    a light guiding unit where light from the light source is supplied to an end surface, and light incident from the end surface is propagated inside to exit from the other end surface;
    an illuminating optical system that spatially separates a luminous flux output from the other end surface of the light guiding unit into a plurality of luminous fluxes and that forms, on a display element, an optical image that is formed on the other end surface of the light guiding unit;
    a reflective polarizing plate that is located between the illuminating optical system and the display element and that transmits first polarized light while reflecting second polarized light different in polarized state from the first polarized light toward the illuminating optical system;
    a reflecting element that is disposed at a position where the plurality of luminous fluxes are spatially separated and that reflects light reflected by the reflective polarizing plate toward the reflective polarizing plate; and
    a phase plate that is located between the reflecting element and the reflective polarizing plate,
    wherein the reflecting element includes a transmission region through which the plurality of luminous fluxes are transmitted, and a reflecting film that is formed in a region other than the transmission region;
    a light emitting center of the light source is located on a center axis that passes through a center of gravity of both end surfaces of the light guiding unit; and
    the illuminating optical system forms, on the reflecting film, a plurality of optical images that is formed on the reflective polarizing plate by the second polarized light of the plurality of luminous fluxes that passed through the transmission region.

2. The illumination device according to claim 1, wherein the illuminating optical system includes:
    a first lens group that is located between the light guiding unit and the reflecting element and that separates the luminous flux output from the other end surface of the light guiding unit into the plurality of luminous fluxes; and
    a second lens group that condenses the plurality of luminous fluxes that passed through the reflecting element on the display element; and
    when seen from a direction vertical to a plane that intersects both optical axes of the first and second lens groups, the optical axis of the first lens group is shifted with respect to that of the second lens group.

3. The illumination device according to claim 2, wherein the reflecting film is formed into a striped shape and, when seen from a direction vertical to a surface of the reflecting element, a longitudinal direction of the reflecting film intersects a shifting direction of the optical axis of the first lens group with respect to that of the second lens group.

4. The illumination device according to claim 3, wherein a width of the reflecting film is equal to or more than that of the transmission region.

5. The illumination device according to claim 1, wherein the illuminating optical system includes:
    a first lens group that is located between the light guiding unit and the reflecting element and that separates the luminous flux output from the other end surface of the light guiding unit into the plurality of luminous fluxes;
    a second lens group that condenses the plurality of luminous fluxes that passed through the reflecting element on the display element; and
    a parallel plate that is located between the reflecting element and the first lens group and that shifts an incident position of the plurality of luminous fluxes on the reflecting element; and
    an optical axis of the first lens group matches that of the second lens group.

6. The illumination device according to claim 5, wherein the reflecting film is formed into a striped shape and, when seen from a direction vertical to a surface of the reflecting element, a longitudinal direction of the reflecting film intersects a shifting direction of the parallel plate.

7. The illumination device according to claim 6, wherein a width of the reflecting film is equal to or more than that of the transmission region.

8. The illumination device according to claim 1, wherein the illuminating optical system comprises a first plurality of lenses formed between the light guiding unit and the reflecting element, and a second plurality of lenses formed between the reflecting element and the phase plate.

9. The illumination device according to claim 8, wherein the first plurality of lenses separates the luminous flux output from the other end surface of the light guiding unit into the plurality of luminous fluxes, and the second plurality of lenses condenses the plurality of luminous fluxes that pass through the reflecting element on the display element.

10. The illumination device according to claim 8, wherein the first plurality of lenses comprises a first optical axis which matches the center axis of light guiding unit, and the second plurality of lenses comprises a second optical axis which matches a center of gravity of the reflecting element, the phase plate, the reflective polarizing plate, and the display element, the first optical axis being shifted with respect to the second optical axis.

11. The illumination device according to claim 8, wherein the reflecting element is formed between the first plurality of lenses and the second plurality of lenses, and
    wherein the reflecting film comprises a plurality of reflecting films and the transmission region comprises a plurality of transmission regions which are alternately formed with the plurality of reflecting films.

12. The illumination device according to claim 11, wherein the plurality of reflecting films are located in a space between the plurality of luminous fluxes spatially separated by the first plurality of lenses, and the plurality of transmission regions are located such that the plurality of luminous fluxes separated by the first plurality of lenses can pass through the plurality of transmission regions.

13. The illumination device according to claim 1, wherein the reflective polarizing plate comprises a wire-grid type polarizing plate, the display element comprises a liquid crystal display (LCD) panel, the light source comprises a light-emitting diode (LED), and the light guiding unit comprises a light guiding rod comprising one of optical glass and optical plastic.

14. A projection type display device comprising:
an illumination device;
a display element that is illuminated with light from the illumination device; and
a projection optical system that projects image light from the display element,
wherein the illumination device includes:
a light source;
a light guiding unit where light from the light source is supplied to an end surface, and light incident from the end surface is propagated inside to exit from the other end surface;
an illuminating optical system that spatially separates a luminous flux output from the other end surface of the light guiding unit into a plurality of luminous fluxes and that forms, on the display element, an optical image that is formed on the other end surface of the light guiding unit;
a reflective polarizing plate that is located between the illuminating optical system and the display element and that transmits first polarized light while reflecting second polarized light different in polarized state from the first polarized light toward the illuminating optical system;
a reflecting element that is disposed at a position where the plurality of luminous fluxes are spatially separated and that reflects light reflected by the reflective polarizing plate toward the reflective polarizing plate; and
a phase plate that is located between the reflecting element and the reflective polarizing plate,
wherein the reflecting element includes a transmission region through which the plurality of luminous fluxes are transmit, and a reflecting film that is formed in a region other than the transmission region,
wherein a light emitting center of the light source is located on a center axis that passes through a center of gravity of both end surfaces of the light guiding unit, and the illuminating optical system forms, on the reflecting film, a plurality of optical images that is formed on the reflective polarizing plate by the second polarized light of the plurality of luminous fluxes that passed through the transmission region.

15. An illumination device, comprising:
an illuminating optical system that spatially separates a luminous flux into a plurality of luminous fluxes and that forms an optical image on a display element;
a reflective polarizing plate that is located between the illuminating optical system and the display element and that transmits first polarized light while reflecting second polarized light different in polarized state from the first polarized light toward the illuminating optical system;
a reflecting element that is formed where the plurality of luminous fluxes are spatially separated and reflects light reflected by the reflective polarizing plate toward the reflective polarizing plate, the reflecting element comprising:
a transmission region through which the plurality of luminous fluxes are transmitted; and
a reflecting film that is formed in a region other than the transmission region, the illuminating optical system forming on the reflecting film, a plurality of optical images that is formed on the reflective polarizing plate by the second polarized light of the plurality of luminous fluxes that pass through the transmission region; and
a phase plate that is located between the reflecting element and the reflective polarizing plate.

16. The illumination device according to claim 15, further comprising:
a light source;
a light guiding unit comprising:
a first surface to which light from the light source is supplied; and
a second surface through which light incident from the first surface and propagating inside the light guiding unit exits,
wherein a light emitting center of the light source is located on a center axis that passes through a center of gravity of the first and second surfaces of the light guiding unit, and
wherein the luminous flux is output from the second surface of the light guiding unit to the illuminating optical system.

* * * * *